United States Patent Office 2,869,643
Patented Jan. 20, 1959

2,869,643

TREATMENT OF OIL AND GAS WELLS

Albert G. Schuessler and Charles B. Swain, Oklahoma City, Okla., assignors to Swift & Company, Chicago, Ill., a corporation of Illinois No Drawing. Application March 25, 1957
Serial No. 647,955

6 Claims. (Cl. 166—42)

This invention pertains to treatment of oil and gas wells. More particularly, the invention relates to improved hydraulic fracture techniques whereby the pressure necessary to fracture a subterranean formation may be substantially reduced.

This application is a continuation-in-part of our copending application Serial No. 557,238, filed January 4, 1956, which application is, in turn, a continuation-in-part of application Serial No. 493,284, filed March 9, 1955.

Hydraulic fracture, or hydrofracing as it is often called in the oil industry, of oil or gas bearing formations is achieved by exertion of increasing quantities of pressure on a liquid in the well bore until pressure is built up sufficiently to produce a fracture of the formation. The fracture is generally thought to occur along horizontal bedding planes where the tensile strength of the formation is usually the weakest, but occasionally, and particularly in non-stratified or unconsolidated formations, fracture appears to occur along a vertical plane. The fracturing fluid is pumped into the well at a rate which causes the pressure to rise until fracture occurs. Fracture is recognized generally by a sharp break in pressure after which the pressure remains fairly constant as the fluid penetrates the new crack. After fracture, the pressure is relieved, and the well is put into production.

Fracture generally occurs in or adjacent the formation plane of the highest permeability to the fracturing fluid. However, in many instances, it has been found in fracture practice that the planes of highest native permeability and porosity are more resistant to fracture than sources having a lower native porosity and permeability. This is attributed to the invasion of mud solids during the drilling operation wherein the planes of highest native permeability and porosity are invaded by mud solids to a much greater extent than planes of lower porosity and permeability—resulting in the zones of highest native permeability being more resistant to penetration of the fracturing fluid than zones of lower native permeability because of the resistance increase caused by the invaded mud solids. It is obviously more desirable to fracture the zone of higher native permeability and porosity, and fracture thereof is more likely under the practices of this invention wherein the zones of higher porosity and permeability are conditioned so as to restore to a greater extent their native porosity and permeability.

The hydraulic fluids which are generally used are miscible with the interstitial crude oil, e. g., oily liquids, such as crude petroleum oils, a refined fraction of crude oils, e. g., gasoline, kerosene, diesel oil, naphtha, etc., and, much less often than the above, animal, vegetable and fish triglyceride oils. Aqueous liquids may be used as the fracturing fluid, but under most circumstances, we prefer the oily liquids because of the adverse effects of water in decreasing the permeability of the interstitial openings of the formation to the flow of oil and gas. Aqueous fluids are occasionally used to advantage in situations where it is believed that salt crystals are responsible for at least a portion of the lost permeability, in which case the aqueous fluid dissolves the salt crystals which would be unaffected by the petroleum type fracture fluids. Another embodiment of fracturing fluids comprises viscous water-in-oil emulsions, the aqueous phase containing concentrated hydrochloric acid, wherein the hydrochloric acid after fracture reacts with the calcareous formations to further increase permeability.

The viscosity of these fracturing fluids often is increased by the addition of other compositions to the base fluid. In the case of petroleum oils or its fractions, gelling agents, which tend to thicken the oil, enable the suspension of formation props or spacer materials in the fluid. Soaps of fatty acids such as sodium stearate and sodium oleate are commonly used as gelling agents in petroleum base fracture fluids. In addition to alkali metal soaps, other fatty acid soaps of ammonia, metals of the alkali metal and alkaline earth series, or polyvalent metals such as cadmium, mercury, cobalt, lead, nickel and aluminum have been suggested as gelling agents for petroleum base fracturing fluids.

It has been established that the closing of the fracture after release of hydraulic pressures does not result in return of the formation to its original condition, but rather the formation will have a substantial increase in permeability even after the fracture is closed. However, the permeability of the fractured formation may be further increased by the use of the aforementioned formation props or spacer materials such as sand, metal chips, crushed shell, and other oil-inert small particles. These props or spacer materials are suspended in the hydraulic fracture fluid and will enter the formation with the fluid at the point of fracture. When the pressure is released and the fracture fluid flows from the formation, these materials remain to hold the formation apart to some extent at the point of fracture.

Non-gel type fracture fluids are removed from the formation after fracture by simply producing the well. The gelled fluids must first be broken or their viscosity reduced before they may be easily removed from the formation and the well bore. There are several means for breaking the gel, among which are included the addition of a gel breaker or peptizer which may be incorporated in the viscous fracture fluid, said gel breaker becoming effective after a time delay. Water, for example, in sufficient amounts becomes effective to break the gel of fatty acid soaps several hours after the hydraulic fluid has reached the fracture and may be incorporated in the viscous liquid by emulsification. Certain other peptizing agents may be injected into the fracture prior to or after the viscous hydraulic fluid. In some instances, the heat of the formation alone, particularly in deep wells, is sufficient to reduce the viscosity of the gel to a point where it may be removed by producing the well. Another method of gel breaking is the addition of about 1% gel breaker (based on the volume of the fracturing fluid) dissolved in a suitable solvent such as gasoline which is then pumped into the well following the fracture liquid to reduce the viscosity or break the gel. Water soluble amines such as ethanolamine, other similar ammonical compounds, and oil soluble sulfonates have been suggested as effective gel breakers of soap-hydrocarbon gels. Other suitable materials are strong mineral acids.

The hydraulic fracture techniques of the present invention in general involve the dehydration of the surfaces of both the formation solids and the mud particles which invaded the formation during the drilling and completion operations; the oil wetting of the solids; and the removal of the water and mud solids from the formation adjacent the well bore. This is achieved by treatment of the formation, prior to hydraulic fracture, with a surface-active material capable of (1) reducing interfacial tension between water and the mud solids and water and the formation solids sufficiently to facilitate removal of the water from the solid surfaces and (2) oil wetting the solids, particularly the mud solids, upon disruption of the interfacial tension between water and the solids. A third criterion for the surface active agent, although not absolutely necessary to the operability of the instant invention, is the inducement of the formation of a water-in-oil emulsion in which the water is removed as the internal phase through the newly oil-wetted formation. It is important that the normally water wet mud solids, usually bentonitic, which invaded the formation during the drilling and completion operations, be oil wetted by the treatment, in which state the oil, water, and mud solids flow more easily from the well bore face as a low viscosity fluid as compared to a similar mixture of oil, water and water wet mud solids, which is more viscous, and in some instances, a non-flowing mass.

This treatment is followed by hydraulic fracture of the formation, and it has been our experience that this pretreatment with a surface active composition of the character described substantially reduces the hydraulic pressure necessary to fracture the formation. The treatment of the formation with the surface active agent prior to fracture may be accomplished by pumping the fluid into the unfractured formation to remove interstitial water and oil wet the solids, followed by removal of the treating fluid and recovered water and mud solids. However, a more simple and preferred procedure is to pump the treating fluid in a petroleum oil base into the formation immediately ahead of the fracture fluid, allowing the surface active treating fluid to remain in contact with the formation for a sufficient time to obtain the benefits outlined above. The period of time necessary to build the pressure to a point sufficient to fracture the formation is usually a sufficient contact period although we recommend at least a 16-24 hour period where possible. The treating fluid is removed after fracture by producing the well. The invaded drilling mud solids are either removed on producing the well or driven into the formation a sufficient distance from the well bore so as to make their presence in the formation unimportant relative to permeability, the most critical region of the formation being the area adjacent the bore where the pressure drop is the highest.

The surface active treating fluid described in our copending application Serial No. 493,284, filed March 9, 1955, comprising as the major ingredient, an alkali metal salt of sulfated sperm oil and as a minor ingredient, an oil wetting agent such as lead petroleum sulfonate or carboxylic acid salts of aminoalkylamides possess the properties for dehydration and oil wetting of the formation and mud solids. The above composition also may include water and oil-soluble substances such as methyl isobutyl ketone, methyl isobutyl carbinol, methyl ethyl ketone, and isopropyl alcohol which further aid in removal of water from the solid surfaces. A specific formulation which has been found to be quite effective is:

| | Parts |
|---|---|
| Sodium salt of sulfated sperm oil | 60 |
| Carboxylic salts of aminoalkylamides | 20-25 |
| Methyl isobutyl ketone | 15-20 |

The specific oil-wetting agent may be one of those disclosed in U. S. Patent No. 2,737,509 to Murray Jelling.

Materials which will dissolve or emulsify the water present in the producing sands through reduction of surface tension forces holding the water in the sands include those of the type soluble in both water and oil or of the type that will cause the water to form an emulsion with the oil. These materials include the alcohols, ethanol, methanol, n-propanol, and isopropanol; the ethers, such as ethyl ether and its water soluble homologues; ketones such as acetone, ethyl, methyl, and diethyl ketone, methyl isobutyl ketone, methyl ethyl ketone, and their water soluble homologues, and mixtures thereof; phenols such as phenol and cresol; surface active agents such as sulfonated or sulfated long chain aliphatic alcohols and salts thereof; sulfated or sulfonated fatty acids or fatty triglycerides such as castor oil and olive oil; alkyl sulphate salts such as sodium lauryl sulphate; and sulfated sperm oil salts which contain as the major ingredient salts of sulfated wax esters of long chain monohydric alcohols and long chain aliphatic monocarboxylic acids and as a minor ingredient, salts of sulfated triglycerides; alkali metal naphthenates; alkali metal salts of sulfonated mineral oil produced as a by-product by heavy acid treatment of a petroleum fraction to give white oil.

The oil wetting agents, in addition to the preferred carboxylic acid salts of aminoalkylamides and lead petroleum sulfonate, include polyvalent metal salts of petroleum sulfonates of the alkyl aryl type, particularly sulfonates of a crude petroleum of high naphthenic content. Other useful oil wetting agents include lead salt of the sulfonate of the heavy alkylate bottoms obtained in the distillation of dodecyl benzene in the manufacture of the latter; lead, barium, zinc, and calcium petroleum sulfonates (sulfonates of high naphthenic petroleum oil's); alkaline earth and heavy metal salts, including calcium, barium, zinc, and lead, of sulfated triglyceride fats; fatty acid soaps of high molecular weight amines such as dodecyl- or octadecylamine oleate, stearate, or palmitate; oil soluble di-hydroxy aluminum petroleum sulfonates or mixtures of mono- and di-hydroxy aluminum petroleum sulfonates; polyamine soaps of fatty acids; heterocyclic nitrogen base salts of an oil soluble sulfonic acid; alkyl substituted pyrimidines, at least one alkyl group having 10 or more carbons; acyl amido amine soaps of tall oil acids. In some instances, the solubility of the foregoing compositions in oil is improved by using a solvent for the composition, said solvent being oil soluble.

In instances where an aqueous base fluid is employed as the fracture fluid, it is still desirable to pretreat the formation with oil-containing additives of the type previously described to aid in reducing resistance to fracture or at least add one or more additives to the aqueous fracture fluid. This additive in the latter instance should have at a minimum the property of reduction of interfacial tension between water and the formation solids whereby the formation is rendered more easily penetrated by the fracture fluid through decrease of the bonding forces between water and the solids. In any case, we recommend a follow-up treatment after aqueous fluid fracture with an oil-base treating fluid containing a surface active agent having the aforesaid dehydrating and oil-wetting properties in order to more nearly restore the native permeability of the formation by removal of water and water wet mud solids. Aqueous base fracture fluids should only be used under situations where there is a peculiar advantage to their use such as the presence of salt crystals in the formation which are thought to be a substantial contributing factor to lost permeability.

The following example is illustrative of practical field tests of the foregoing invention but is not to be construed as placing any limitation on the invention as defined in the appended claims.

*Example I*

A well in Cleveland County, Oklahoma, had been producing about 100,000 cubic feet of gas. The well was producing no oil and no water. The formation was treated with 36 barrels of oil containing 110 gallons of a composition approximating the formulation previously outlined in this description comprising the sodium salt of sulfated sperm oil, etc. After the treating fluid was in contact with the formation for several hours, the formation was fractured with a fluid containing sand as a propping agent at a breakdown pressure of 2300 p. s. i. Several days after fracture, the well was yielding about 51 barrels of oil per day and about 2,000,000 cubic feet of gas per day.

An offset well in the same field could not be fractured, apparently due to extreme resistance to pentration of the formation by the fracturing fluid. This offset well had not been pretreated before fracture according to the principles of the present invention.

Obviously, many modifications and variations of the invention as hereinbefore set forth may be made without departing from the spirit and scope thereof and therefore only such limitations should be imposed as are indicated in the appended claims.

We claim:

1. In a method of improving the permeability of oil or gas bearing subterranean formations by hydraulic fracture, the improvement which comprises: slowly forcing into the formation a mineral oil having dissolved therein a composition comprising an alkali salt of sulfated sperm oil as the major active ingredient and lead petroleum sulfonate as a minor ingredient; allowing the treating fluid to remain in contact with the formation for a period of time; reversing the flow of the treating fluid for removal of water as a low viscosity water-in-oil emulsion from the formation; pumping a fracturing fluid into the formation; and applying pressure to said fracturing fluid whereby to fracture the formation.

2. In a method of improving the permeability of oil or gas bearing subterranean formations by hydraulic fracture, the improvement which comprises: slowly forcing into the formation a mineral oil having dissolved therein a composition comprising an alkali salt of sulfated sperm oil as the major active ingredient and a carboxylic acid salt of aminoalkylamide as a minor ingredient; allowing the treating fluid to remain in contact with the formation for a period of time; reversing the flow of the treating fluid for removal of water as a low viscosity water-in-oil emulsion from the formation; pumping a fracturing fluid into the formation; and applying pressure to said fracturing fluid whereby to fracture the formation.

3. In a method for improving the permeability of oil or gas bearing subterranean formations by hydraulic fracture, the improvement which comprises: slowly forcing into the formation a mineral oil having dissolved therein an alkali salt of sulfated sperm oil as the major active ingredient and lead petroleum sulfonate as a minor ingredient; pumping a fracturing fluid into the formation; and applying pressure to said fracturing fluid whereby to fracture the formation while the treating fluid is in contact with said formation.

4. In a method of improving the permeability of oil or gas bearing subterranean formations by hydraulic fracture, the improvement which comprises: slowly forcing into the formation a mineral oil having dissolved therein an alkali salt of sulfated sperm oil as the major active ingredient and a carboxylic acid salt of aminoalkylamide as a minor ingredient; pumping a fracturing fluid into the formation; and applying pressure to said fracturing fluid whereby to fracture the formation while the treating fluid is in contact with said formation.

5. In a method of improving the permeability of oil or gas bearing subterranean formations by hydraulic fracture, the improvement which comprises: slowly forcing into the formation a mineral oil having dissolved therein a composition comprising an alkali salt of sulfated sperm oil as the major active ingredient and an oil-wetting agent as a minor ingredient, said oil-wetting agent being selected from the group consisting of lead petroleum sulfonate, an alkyl aryl sulfonate, an amine alkyl aryl sulfonate, a carboxylic acid salt of an aminoalkylamide, and mixtures thereof; allowing the treating fluid to remain in contact with the formation for a period of time; reversing the flow of the treating fluid for removal of water as a low viscosity water-in-oil emulsion from the formation; pumping a fracturing fluid into the formation; and applying pressure to said fracturing fluid whereby to fracture the formation.

6. In a method for improving the permeability of oil or gas bearing subterranean formations by hydraulic fracture, the improvement which comprises: slowly forcing into the formation a mineral oil having dissolved therein an alkali salt of sulfated sperm oil as the major active ingredient and an oil-wetting agent as a minor ingredient, said oil-wetting agent being selected from the group consisting of lead petroleum sulfonate, an alkyl aryl sulfonate, an amine alkyl aryl sulfonate, a carboxylic acid salt of an aminoalkylamide, and mixtures thereof; pumping a fracturing fluid into said formation; and applying pressure to said fracturing fluid whereby to fracture the formation while the treating fluid is in contact with said formation.

References Cited in the file of this patent

UNITED STATES PATENTS

| | | |
|---|---|---|
| 2,268,141 | Kapp et al. | Dec. 30, 1941 |
| 2,342,106 | Jones et al. | Feb. 22, 1944 |
| 2,779,418 | Garst | Jan. 29, 1957 |

UNITED STATES PATENT OFFICE

CERTIFICATE OF CORRECTION

Patent No. 2,869,643       January 20, 1959

Albert G. Schuessler et al.

It is hereby certified that error appears in the above numbere patent requiring correction and that the said Letters Patent should read as corrected below.

In the grant, lines 2 and 3, for "assignors to Swift & Company )f Chicago, Illinois, a corporation of Illinois," read -- assignors ;o Swift & Company, of Chicago, Illinois, a corporation of Illinois ind Mud Control Laboratories, Inc., of Oklahoma City, Oklahoma, a corporation of Delaware, --; line 12, for "Swift & Company, its uccessors" read -- Swift & Company and Mud Control Laboratories, nc., their successors --; in the heading to the printed specific- ition, lines 4 and 5, for "assignors to Swift & Company, Chicago, ll., a corporation of Illinois" read -- assignors to Swift & ompany, Chicago, Ill., a corporation of Illinois, and Mud ontrol Laboratories, Inc., Oklahoma City, Okla., a corporation f Delaware --.

Signed and sealed this 11th day of October 1960.

SEAL)
ttest:
ARL H. AXLINE
ttesting Officer

ROBERT C. WATSO
Commissioner of Patent